July 27, 1965  R. T. MIYASHIRO  3,197,190
VEHICLE COIL SPRING STIFFENER
Filed April 30, 1964
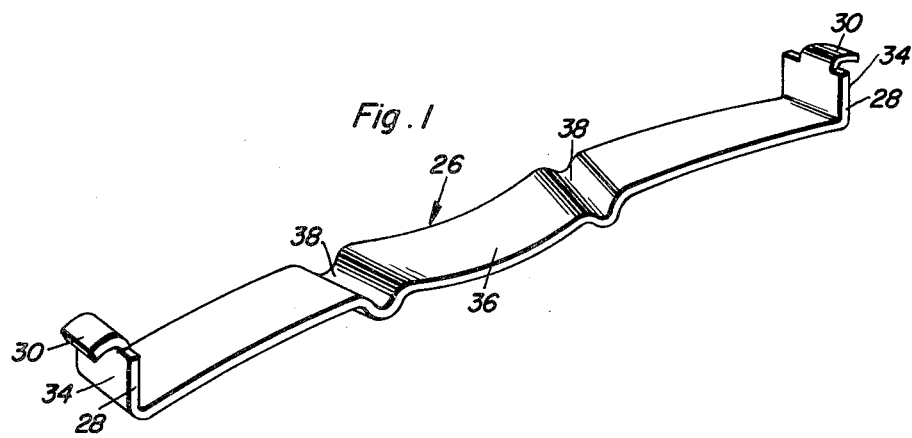
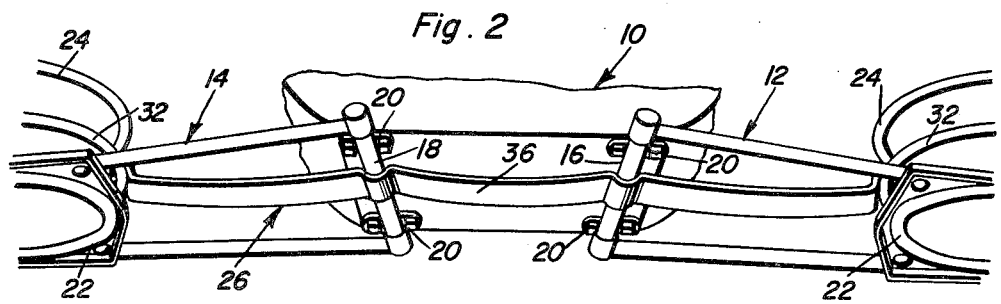
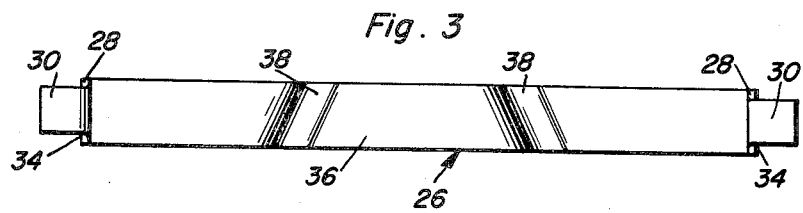
Richard T. Miyashiro
INVENTOR.

United States Patent Office 3,197,190
Patented July 27, 1965

3,197,190
VEHICLE COIL SPRING STIFFENER
Richard T. Miyashiro, 613 S. Queen St.,
Honolulu, Hawaii
Filed Apr. 30, 1964, Ser. No. 366,683
6 Claims. (Cl. 267—11)

This invention relates to a novel and useful vehicle coil spring stiffener and more specifically to an attachment which may be operatively associated with the suspension system of a vehicle utilizing coil springs and utilized as a coil spring stabilizer, a coil spring equalizer and a coil spring booster.

Substantially all of the domestic passenger automobiles are presently being manufactured with independent front wheel suspension systems utilizing coil springs for suspension of the front wheels. The lower ends of these coil springs are engaged with spring sockets carried by the outer ends of a lower A-frame whose inner end is pivotally secured to the vehicle frame and after continued use coil springs will sometimes lose their resiliency. If the coil springs of a vehicle become weakened, the height of the corresponding sprung portion of the vehicle will be reduced. Not only does this reduction in height reduce the travel of a wheel assembly sprung by means of a weak coil spring from its normal static load position to its maximum compressed position, but the center of gravity of the corresponding portion of the vehicle will be lowered.

If weak coil springs may be found in a vehicle front end assembly utilizing steerable front wheels, the geometry of the steerable wheels is disrupted due to the sagging of the weakened coil springs and the disturbance in the geometry of the steering assembly can have a tendency to make the vehicle pull to one side or the other, cause excessive tire wear and accelerated wear in other components of the front end assembly.

Accordingly, it is the main object of this invention to provide a coil spring stiffener for boosting the coil springs of a vehicle front end assembly.

A further object of this invention, in accordance with the preceding object, is to provide a vehicle coil spring stiffener which will be capable of also acting as a coil spring stabilizer and has a coil spring equalizer.

A still further object of this invention is to provide a coil spring stiffener which may be readily installed on existing vehicles provided with front end suspension assemblies utilizing coil springs.

Another object of this invention is to provide a coil spring stiffener in accordance with the preceding objects which may be installed on a conventional type of motor vehicle utilizing a coil spring front wheel suspension assembly without the use of special tools.

A further object of this invention is to provide a vehicle coil spring stiffener constructed of one one piece not requiring any additional component parts for securing the spring stiffener to a vehicle suspension assembly.

A final object to be specifically enumerated herein is to provide a vehicle coil spring stiffener in accordance with the preceding objects which will conform to conventional forms of manufacture, be of simple construction and easy to install so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of the vehicle coil spring stiffener of the instant invention;

FIGURE 2 is a fragmentary perspective view of a portion of a front wheel suspension assembly for a vehicle shown with the coil spring stiffener of the instant invention operatively associated therewith; and FIGURE 3 is a top plan view of the coil spring stiffener.

Referring now more specifically to the drawings in FIGURE 2 there may be seen a portion of a vehicle frame which is generally designated by the reference numeral 10. The inner ends of a pair of A-frames generally referred to by the reference numerals 12 and 14 are pivotally secured to the portion of the frame 10 by means of pivot shafts 16 and 18 which are secured to the frame portion by means of suitable brackets 20. The outer ends of the A-frames 12 and 14 are each provided with a spring seat 22 and the lower end of a coil spring 24 is secured in each of the seats 22.

It is to be noted that the A-frames are utilized to swingably mount the front wheel assemblies to the vehicle frame portion 10 and that the aforementioned structure is conventional.

The vehicle coil spring stiffener of the instant invention is generally designated by the reference numeral 26 and comprises an elongated leaf spring assembly. The leaf spring assembly 26 is composed of a single leaf spring whose opposite ends are upturned as at 28 and terminate at their free ends in oppositely directed flanges 30. Each of the flanges 30 is arcuate in longitudinal cross-section and opens downwardly to define a downwardly opening recess for snugly and embracingly receiving one of the convolutions 32 of the corresponding coil spring 24. The remote surfaces 34 of the upturned end portions 28 define abutments for abutting engagement with the adjacent portions of the convolutions 32 with which the flanges 30 are engaged.

As can best be seen from FIGURE 2 of the drawings the leaf spring 26 extends between the coil springs 24 and has its center portion 36 intermediate its opposite ends disposed in surface-to-surface contacting relation with the undersurface of the frame portion 10.

As positioned in FIGURE 2 of the drawings the leaf spring 26 has its opposite ends urged upwardly relative to the center portion 36 from their normal positions. The flanges 30 are engaged with the convolutions 32 of the coil springs 24 and the opposite ends of the leaf spring 26 apply a downward thrust on the convolutions 32 with which they are engaged while the center portion 36 of the spring 26 bears upwardly against the frame portion 10.

The remote surfaces 34 of the upturned ends 28 engage the adjacent surfaces of the convolutions 32 with which the leaf spring 26 is engaged and these convolutions 32 are therefore prevented from moving toward each other. Additionally, as the flanges 30 define downwardly opening recesses which embracingly engage the upper portions of the corresponding spring convolution 32, the spring convolutions 32 with which the leaf spring 26 is engaged are also retained against movement away from each other. Accordingly, it may be seen that the leaf spring 26 also functions as a coil spring stabilizer.

If it is desired, the flanges 30 may be engaged with alternate convolutions 32 depending upon the condition of each of the coil springs 24.

It can best be seen from FIGURES 1 and 2 of the drawings that the leaf spring 26 includes a center portion 36 which defines a plurality of upwardly opening and transversely extending channels 38 each of these channels defining an upwardly opening recess which snugly embraces the corresponding pivot shaft. In this manner, the leaf spring 26 engages the pivot shafts 16 and 18 to prevent longitudinal shifting of the leaf spring 26 transversely of the vehicle to which the leaf spring is secured. In addition, it will be noted that corresponding ends of the channels 38 are convergent and that the pivot pins or shafts 16 and 18 are similarly angularly disposed. Accordingly, it may be seen that when the pivot shafts 16 and 18 are snugly and embracingly received within the channels 38 that the leaf spring 26 may not be either rotated about a vertical axis passing through the center portion 36 or laterally shifted longitudinally of the vehicle. Accordingly, it may be seen that the leaf spring 26 is fully capable of boosting the coil springs 24, functioning as a coil spring equalizer and also functioning as a coil spring stabilizer.

In operation, the leaf spring 26 may be installed by jacking up the frame portion 10 and allowing the spring seats 22 to drop whereupon the center portion of the leaf spring 26 may be readily positioned beneath the frame portion 10 with the opposite end flanges 30 of the leaf spring 26 disposed for engagement with a selected one of the convolutions 32 of the springs 24. Then, the vehicle portion 10 may be lowered whereupon the weight of the frame on the supporting wheels (not shown) of the vehicle will compress the coil springs 32 to the extent that the leaf spring 26 will be flexed. Inasmuch as the center portion 36 of the leaf springs 26 is prevented against upward movement relative to the frame 10 and may not be laterally shifted relative to the frame 10, it may be seen that the leaf spring 26 requires no special mounting brackets or tools. After jacking up the frame portion 10 it is merely necessary to properly position the leaf spring 26 and then lower the frame portion 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle coil spring stiffener for boosting the coil springs of a vehicle having a pair of spaced wheel assemblies individually sprung by means of a pair of coil springs and including a frame portion disposed between said coil springs, said coil spring stiffener including elongated leaf spring means having opposite end portions each adapted to engage a convolution of the corresponding one of said springs and a generally horizontally disposed portion intermediate the opposite end portions adapted to bear against said frame portion, and defining a pair of upwardly opening channels extending transversely of said leaf spring means adapted to snugly and embracingly receive the inner pivot shafts of A-frames with which said springs are operatively associated and which extend beneath portions of said frame portion.

2. The combination of claim 1 wherein said channels are convergent toward one pair of corresponding ends thereof.

3. In combination with a vehicle including a pair of spaced wheel assemblies and a frame portion disposed therebetween from which said wheel assemblies are supported by means of a pair of A-frames having their adjacent ends secured to said frame portion by means of inner pivot shafts, a pair of coil springs having their lower ends bearing against the free ends of said A-frames, a coil spring stiffener comprising an elongated leaf spring assembly having opposite end portions defining downwardly opening recesses each snugly receiving a convolution of the corresponding coil spring, said stiffener also including an intermediate portion disposed between its opposite end portions bearing upwardly against the lower surface of said frame portion disposed between said A-frames, said elongated leaf spring assembly comprising a single leaf spring, said opposite end portions each including an upturned end terminating at its free end in an outwardly directed flange defining said recesses, said upturned ends including remote surfaces each defining an abutment for the adjacent portion of the corresponding spring convolution.

4. In combination with a vehicle including a pair of spaced wheel assemblies and a frame portion disposed therebetween from which said wheel assemblies are supported by means of a pair of A-frames having their adjacent ends secured to said frame portion by means of inner pivot shafts, a pair of coil springs having their lower ends bearing against the free ends of said A-frames, a coil spring stiffener comprising an elongated leaf spring assembly having opposite end portions defining downwardly opening recesses each snugly receiving a convolution of the corresponding coil spring, said stiffener also including an intermediate portion disposed between its opposite end portions bearing upwardly against the lower surface of said frame portion disposed between said A-frames, said intermediate portion defining a pair of upwardly opening channels extending transversely of and spaced longitudinally of said leaf spring assembly snugly and embracingly receiving said pivot shafts.

5. The combination of claim 4 wherein said elongated leaf spring assembly comprises a single leaf spring, said opposite end portions each including an upturned end terminating at its free end in an outwardly directed flange defining said recesses, said upturned ends including remote surfaces each defining an abutment for the adjacent portion of the corresponding spring convolution.

6. A vehicle spring stiffener for boosting the spring assemblies of a vehicle having a frame and a pair of spaced wheel assemblies, sprung by means of spring assembly means reacting between said frame and said wheel assemblies, said frame including a portion disposed between said wheel assemblies, said spring stiffener including elongated leaf spring means having opposite end portions adapted to engage and bear down on predetermined portions of said spring assemblies and a portion disposed intermediate said opposite end portions adapted to bear upwardly against said frame portion and defining upwardly opening channel means extending transversely of said spring means adapted to snugly and seatingly receive a portion of said vehicle defining a depending ridge extending transversely of a line extending between said spring assemblies whereby longitudinal shifting of said spring means relative to said vehicle may be prevented by the seated engagement of said ridge in said channel means.

References Cited by the Examiner
UNITED STATES PATENTS

| | | | |
|---|---|---|---|
| 2,181,692 | 11/39 | Crowell | 267—16 |
| 2,603,481 | 7/52 | Wolze | 267—16 |
| 2,697,613 | 12/54 | Aiacosa | 280—124 |
| 2,741,475 | 4/56 | Roehrig | 267—11 |

FOREIGN PATENTS

| | | |
|---|---|---|
| 1,161,498 | 3/58 | France. |
| 1,173,879 | 10/58 | France. |

A. HARRY LEVY, *Primary Examiner.*

LEO FRIAGLIA, *Examiner.*